United States Patent Office 3,462,245
Patented Aug. 19, 1969

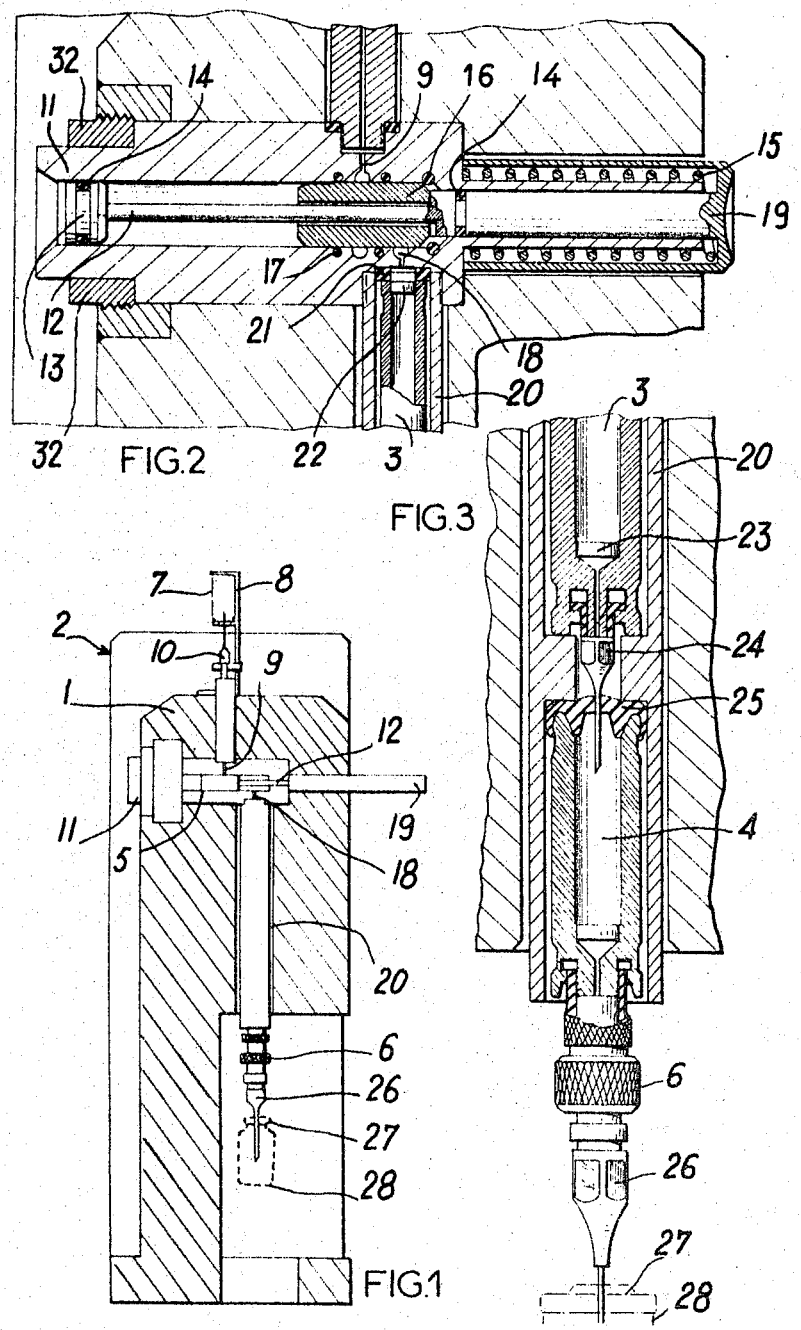

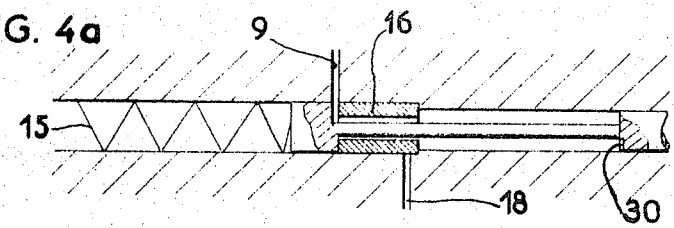
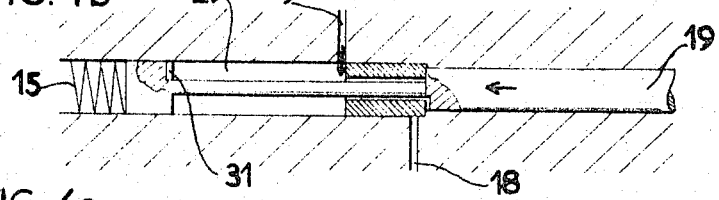
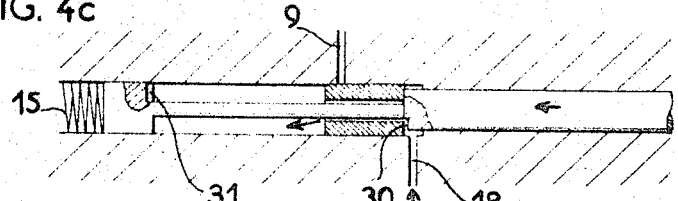
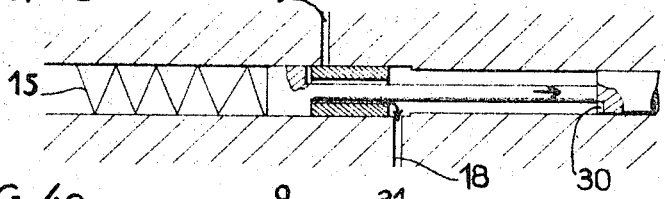
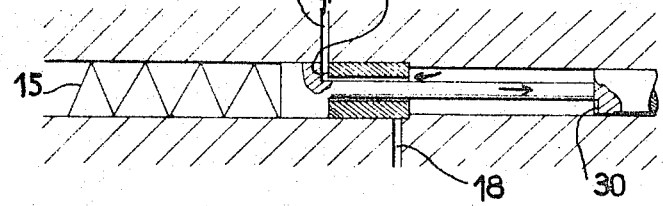

3,462,245
DEVICE FOR THE PRODUCTION OF RADIOELEMENTS
Marcel Eudes, Courbevoie, and Pierre de Vernejoul, Hopital D'Orsay, France, assignors to Societe Saint-Gobain Techniques Nouvelles, Courbevoie, France
Filed Feb. 7, 1966, Ser. No. 525,728
Claims priority, application France, Feb. 10, 1965, 5,010
Int. Cl. B01d 59/28
U.S. Cl. 23—252          4 Claims

ABSTRACT OF THE DISCLOSURE

A short-lived daughter product is separated from a long-lived radioelement fixed on an ion-exchange resin contained in an active ampoule situated within a lead shield by an eluant for the short-lived daughter product drawn through a hypodermic needle into a pump body from a supply ampoule and then pumped into the active ampoule. The eluate from the active ampoule passes by way of another hypodermic needle through the stopper of a retaining ampoule containing an inactive resin and thence from the device through a bacteriological filter.

---

This invention relates to a device for separating on ion-exchange resins a long-lived radioelement from its short-lived daughter product and which is more especially intended for medical uses.

Among the various possible pairs, only a small number is of practical interest; there can be mentioned in particular the production of gallium-68 from germanium-68, of lanthanum-140 from barium-140, of yttrium-90 from strontium-90, of barium-137 from caesium-137.

Barium-137 is highly valued in medicine on account of its very short half-life and also by reason of the fact that it is a γ-ray emitter only. Thus, barium-137 can be injected into the human body and, by virtue of its γ-ray emission, can make it possible to carry out different studies on blood circulation in vivo.

The device which is proposed by the invention is of particular interest although not exclusively so, for the practical application of the method of preparation of barium-137 as previously described in the French patent application entitled "Method of preparation of barium-137" as filed on Nov. 8, 1963 by the present applicant and in its first Certificate of Addition filed on Oct. 15, 1964. The device is also suitable for the preparation of other radioelements such as gallium-68, lanthanum-140, yttrium-90, iodine-132 from their long-lived parents.

The apparatus in accordance with the invention is essentially characterized in that it comprises within a lead shield an active ampoule containing the resin on which the long-lived radioelement is fixed, said ampoule being fitted with a hypodermic needle at the lower end thereof, a retaining ampoule which contains an inactive resin and is closed at the upper end by a rubber stopper which is traversed by said needle, a bacteriological filter for the sterilization of the eluate, a pump consisting of a pump body in which are slidably mounted a piston and slide-valve distributor, said pump body being designed to communicate with an inlet pipe which is connected by way of a hypodermic needle to an ampoule containing the eluent.

A clearer understanding of the invention will be obtained by consideration of the following description, reference being made to the accompanying drawings, in which:

FIG. 1 is a diagrammatic sectional view of the complete device in accordance with the invention;

FIG. 2 is a sectional view of the pump;

FIG. 3 is a sectional view of that portion of the device which contains the active ampoule and the retaining ampoule;

FIG. 4 is a diagram of operation of the pump.

The device which is shown diagrammatically in FIG. 1 is essentially constituted by a shielded cubicle 1 enclosed in a casing 2, a stainless steel tube 20 in which are superposed in a suitable manner an active ampoule 3 on which is fixed the radioelement to be eluted, and a retaining ampoule 4, a pump 5, a sterilizing filter 6.

The eluent is contained in the ampoule 7 which is held in a bracket 8. Said ampoule communicates with the inlet pipe 9 by way of a hypodermic needle 10.

In FIG. 2, which represents a longitudinal sectional view of the pump 5, the reference numeral 11 designates the pump body. In order to provide ease of access to the sealing rings, the pump body 11 can be made up of three sections encased in a sleeve, not shown in the figure. There is movably mounted inside said pump body a piston having a rod which is designated by the reference numeral 12 and a head which is designated by the reference 13. Fluid-tightness of the piston is ensured by means of piston rings 14. The piston is moved to the rear position thereof either by means of a spring 15 which permits of a slow return motion or by means of slow manual traction exerted by the operator. The pump also comprises a slide-valve distributor 16, fluid-tightness of which is ensured by means of sealing rings 17. The slide-valve distributor, which moves only at the ends of travel of the piston, alternately closes off the inlet pipe 9 and the exhaust port 18. The pump is hand-operated by means of the push-rod 19.

A readily detachable tube 20 is brought to bear on a sealing gasket 21 and supports the active ampoule 3. Said ampoule is closed off by sintered glass discs 22 and 23 which are forcibly fitted therein and imprison the resin, said discs being in turn protected by a prefilter which is formed of glass wool. A hypodermic needle 24 is fitted at the bottom of said ampoule 3 and traverses the rubber stopper 25 of the retaining ampoule 4, the function of which is to perfect the decontamination and to guard against any accidental leakage of the long-lived radioelement. The retaining ampoule is locked to a bacteriological filter 6 which is designed to ensure the sterilization of the eluate. Said ampoule 4 has an extension in the form of a hypodermic needle 26 which passes through the rubber stopper 27 of a receiving flask 28. The assembly consisting of retaining ampoule, filter and receiving flask is joined by hand to the active ampoule 3 and held in place as a result of the mere friction of the needle 24. This assembly can also be fixed to the active ampoule by a suitable locking means if the particular utilization of the apparatus calls for operation at higher pressure.

FIG. 4 is a diagrammatic representation of the cycle of operation of the pump.

FIG. 4a shows the pump in the stationary position.

The operation of said pump is performed in four stages as represented diagrammatically in FIGS. 4b, 4c, 4d, 4e, namely as follows:

1st stage: In the starting position, the slide-valve distributor 16 closes off the exhaust port 18 whilst the inlet pipe 9 remains open. The push-rod is depressed, the piston accordingly moves and produces a partial vacuum within the chamber 29, the eluent contained in the ampoule 7 is sucked through the hypodermic needle 10 and fills said chamber.

2nd stage: At the end of travel of the piston, the slide-valve distributor is drawn back by the piston and unmasks the exhaust port 18 while closing off the inlet pipe 9. The active ampoule is then drained of all trace of air and the liquid rises within the chamber 29 by way of a recess 30 which is formed in the piston.

3rd stage: Under the action of the spring 15, the piston is returned slowly to its initial position whereas the slide-valve distributor remains stationary; the liquid contained in the chamber 29 is then discharged into the active ampoule.

4th stage: When the piston reaches the end of its travel, the slide-valve distributor returns to the admission position and the liquid which still remains within the chamber flows through the recess 31 and is discharged through the inlet pipe 9.

In the case of preparation of barium-137, the above cycle can be repeated at approximately ten-minute intervals, namely the time which is necessary in order to restore the equilibrium caesium-137—barium-137.

The device in accordance with the invention has a certain number of useful features. Among these can be mentioned the fact that it is made up of an assembly of parts which can be taken apart separately without dismantling the lead cubicle. Thus, it is merely necessary to unscrew the locking nut 32 in order to separate the different pump components. The tube 20 which supports the active ampoule can also be readily detached and permits of rapid replacement of said ampoule without direct manipulation.

The use of hypodermic needles avoids any leakage along the walls and has an advantage in that it reduces dead spaces as well as reducing the time which is necessary for the replacement of the retaining cartridges.

The practical utilization of the device is particularly simple inasmuch as the elution of the active cartridge is obtained by means of a single operation. The device is particularly well suited to the application of the method of preparation of barium-137 as described in the patent applications which have been cited above, the whole advantage of which lies in the possibility of carrying out a very large number of injections on a same resin which is charged with caesium-137, whereas it was hardly possible by means of the methods of the prior art to exceed twenty injections without caesium contamination of the eluate.

A device which was actually constructed had the following characteristics:

The active ampoule on which an activity of 50 mc. had been fixed had a capacity of 0.7 cm.$^3$ of resin having a particle diameter of 0.1 to 0.2 mm. Said ampoule was closed at both ends by two sintered glass discs of 20/30$\mu$ and was fitted with a hypodermic needle with locking system. The retaining ampoule which was filled with the same resin but in the inactive state had a capacity of 0.3 cm.$^3$. Said retaining ampoule was closed by a rubber stopper forcibly fitted at the upper end and was locked to a sterile and non-pyrogenetic bacteriological filter. The filter employed was a Millipore filter mounted on a Millipore "Swinny filter." The pump, active ampoule and retaining ampoule were fabricated of stainless steel with silicon seals.

The piston had a useful cross-section of 0.4 cm.$^2$, its total stroke was 50 mm., the delivered volume was 1.6 cm.$^3$. The strength of the spring was between 2 and 4 kgs., the available pressure was between 5 and 10 bars.

What we claim is:

1. Device for the separation of a short-lived daughter product from a long-lived radioelement on an ion-exchange resin, which apparatus comprises: an active ampoule containing the resin on which the long-lived radioelement is fixed and having a first hypodermic needle at the lower end thereof; a lead shield surrounding at least said active ampoule; a retaining ampoule containing an inactive resin and being closed at its upper end by a stopper which is traversed by said first needle; a bacteriological filter operably connected with the retaining ampoule for sterilization of liquid passing from it; and a pump connected with the active ampoule and consisting of a pump body in which are slidably mounted a piston and slide-valve distributor, said pump body communicating through an intermediary second hypodermic needle with a supply ampoule containing an eluant for the short-lived daughter product, the arrangement being such that, in operation, eluant is drawn into the pump body from the supply ampoule via the second hypodermic needle and is then passed into the active ampoule and eluate from the active ampoule passes via the first hypodermic needle into the retaining ampoule and thence through the bacteriological filter from the device.

2. Device in accordance with claim 1, characterized in that the active ampoule is closed at both ends by two sintered glass dics which are forcibly fitted in position and protected by a pre-filter of glass wool.

3. Device in accordance with claim 1, characterized in that the pump, the active ampoule, the retaining ampoule and the hypodermic needles are constructed of stainless steel.

4. Device in accordance with claim 1, characterized in that the active ampoule is locked in position within a tube which forms a protective sheath and can be detached for the purpose of replacing said ampoule without direct manipulation.

References Cited

UNITED STATES PATENTS 2,877,093  3/1959  Tompkins et al. _____ 23—338

MORRIS O. WOLK, Primary Examiner

J. D. OLSEN, Assistant Examiner

U.S. Cl. X.R.

23—259, 338; 128—1.1, 1.2; 210—24